(12) United States Patent
Kato et al.

(10) Patent No.: US 8,783,118 B2
(45) Date of Patent: Jul. 22, 2014

(54) CONTROL UNIT FOR ELECTRIC POWER STEERING DEVICE

(75) Inventors: Shinichiro Kato, Saitama (JP); Takeshi Wakabayashi, Saitama (JP); Katsumi Sahoda, Saitama (JP); Tsuyoshi Tsuda, Saitama (JP); Hiroyuki Kaneta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 361 days.

(21) Appl. No.: 13/073,556

(22) Filed: Mar. 28, 2011

(65) Prior Publication Data

US 2011/0239787 A1    Oct. 6, 2011

(30) Foreign Application Priority Data

Mar. 31, 2010  (JP) ................................. 2010-080928

(51) Int. Cl.
*G01L 3/00*    (2006.01)

(52) U.S. Cl.
USPC .................................................... 73/862.335

(58) Field of Classification Search
CPC .......... B62D 5/0409; B62D 6/10; B62K 5/01; B62K 5/027; B62K 5/08
USPC .................................................... 73/862.335
See application file for complete search history.

(56) References Cited

U.S. PATENT DOCUMENTS

2008/0216589 A1*  9/2008  Shimizu .................... 73/862.333
2008/0257635 A1*  10/2008  Shimizu et al. ............... 180/446

FOREIGN PATENT DOCUMENTS

| JP | 2001-336998 A | 12/2001 |
|----|---------------|---------|
| JP | 2005-043336 A | 2/2005 |
| JP | 2006-168515 A | 6/2006 |
| JP | 2008-83063 A | 4/2008 |

\* cited by examiner

*Primary Examiner* — Lisa Caputo
*Assistant Examiner* — Brandi N Hopkins
(74) *Attorney, Agent, or Firm* — Birch, Stewart, Kolasch & Birch, LLP

(57) ABSTRACT

A bending load acting on a steering shaft only with a magnetostrictive torque sensor, without separately providing a sensor for detecting the bending moment. A storage unit stores, as an initial characteristic curve formed from initial detection values, a characteristic curve formed from detection values of each of a first detection coil and a second detection coil when only twisting torque is applied to a steering shaft. A bending load detector provided in an ECU detects a bending load amount acting on the steering shaft based on a difference between each detection value of the first and second detection coils and the initial detection value on the initial characteristic curve corresponding to the detection value.

20 Claims, 9 Drawing Sheets

CONTROL UNIT FOR ELECTRIC POWER STEERING DEVICE

CROSS-REFERENCE TO RELATED APPLICATIONS

The present application claims priority under 35 USC 119 to Japanese Patent Application No. 2010-080928 filed on Mar. 31, 2010 the entire contents of which are hereby incorporated by reference.

BACKGROUND OF THE INVENTION

1. Field of the Invention

The present invention relates to a control unit for an electric power steering device, and more particularly, to a control unit for an electric power steering device for assisting the steering of a steering wheel based on a detection value of a magnetostrictive torque sensor.

2. Description of Background Art

Electric power steering devices are known for detecting with a torque sensor the twisting torque generated in a steering shaft to assist steering of a steering wheel with an electric motor according to the twisting torque. Such electric power steering device is commonly controlled by a control unit (ECU) of a vehicle.

This type of electric power steering devices include the electric power steering device in which a magnetostrictive torque sensor is used as the torque sensor. See, for example, JP-A No. 2008-83063. The magnetostrictive torque sensor is configured with a magnetostrictive film formed on a surface of the steering shaft and a detection coil provided around the magnetostrictive film. This sensor can be made relatively compact, and therefore has the advantage of contributing to the miniaturization of the vehicle.

Since the magnetostrictive torque sensor is subjected to a bending load, it is necessary to provide plural bearings to reduce bending. However, this causes upsizing of the device and an increase in the production cost.

SUMMARY AND OBJECTS OF THE INVENTION

Accordingly, the present invention has been made under such circumstances, and an object of an embodiment of the present invention is to provide a control unit for an electric power steering device in which a bending load can be detected only by a magnetostrictive torque sensor without separately providing bearings for reducing the bending load acting on a steering shaft. A driver's operation is determined based on the bending load detection value so as to enable assisted control for the electric power steering device according to an operating condition.

As a solution to the above-described problem, the according to an embodiment of the present invention, a control unit for an electric power steering device 2 is provided with a first magnetostrictive film 15 and a second magnetostrictive film 16 with magnetic anisotropic properties opposite in direction to each other, each formed circumferentially on a surface of a steering shaft 7, and a first detection coil 17 and a second detection coil 18 provided around the first magnetostrictive film and the second magnetostrictive film, respectively, for detecting twisting torque applied to the steering shaft based on detection values of the first detection coil and the second detection coil to adjust an assist amount for the steering shaft with a storage unit 31 being provided for storing. As initial characteristic curves C1 and C2 are formed from initial detection values, a characteristic curve formed from detection values of each of the first detection coil and the second detection coil when only twisting torque is applied to the steering shaft. A bending load detector 32 is provided for detecting a bending load amount acting on the steering shaft based on a difference between each detection value of the first and second detection coils and the initial detection value on the initial characteristic curve corresponding to the detection value.

According to an embodiment of the present invention, when twisting torque is applied in one direction from a neutral position of the steering shaft, the initial characteristic curve has an upwardly convex curve shape that reaches a peak at a predetermined torque, on the other hand, when twisting torque is applied in the other direction from the neutral position of the steering shaft, the initial characteristic curve has a gradually decaying curve shape. Also, the initial characteristic curves of the first detection coil and the second detection coil have opposite characteristics with detection values symmetric with respect to the neutral position of the steering shaft. In addition, the bending load detector detects a twisting torque corresponding to each detection value detected by the first detection coil and the second detection coil from a range having the gradually decaying curve shape on one of the initial characteristic curve of the first detection coil and the initial characteristic curve of the second detection coil, and obtains an initial detection value corresponding to the detected twisting torque from a range having the upwardly convex curve shape on the other initial characteristic curve to detect the bending load amount based on a difference between the initial detection value and the detection value detected by the first detection coil or the second detection coil.

According to an embodiment of the present invention, the control unit for the electric power steering device includes an assist characteristic deciding portion 33 that determines a vehicle operating condition based on the bending load amount detected by the bending load detector, and adjusts an assist amount for the steering shaft according to this determination state.

According to an embodiment of the present invention, the assist characteristic deciding portion determines the vehicle operating condition based on the bending load amount detected by the bending load detector and a vehicle speed value detected by a vehicle speed sensor for detecting vehicle speed, and adjusts the assist amount for the steering shaft according to this determination state.

According to an embodiment of the present invention, the assist characteristic deciding portion determines the vehicle operating condition based on the bending load amount detected by the bending load detector, the vehicle speed value of the vehicle speed sensor when this bending load amount is detected, and the twisting torque values from the first detection coil and the second detection coil when this bending load amount is detected, and adjusts the assist amount for the steering shaft according to this determination state.

According to an embodiment of the present invention, the assist characteristic deciding portion decides the assist amount for the steering shaft based on the vehicle speed value of the vehicle speed sensor and the twisting torque values from the first detection coil and the second detection coil. When a bending load amount is detected by the bending load detector, the assist characteristic deciding portion determines the vehicle operating condition based on the bending load amount detected by the bending load detector, and the vehicle speed value of the vehicle speed sensor when this bending load amount is detected, and adjusts the decided assist amount for the steering shaft according to this determination state.

According to an embodiment of the present invention, the assist characteristic deciding portion performs damper feel control for the steering shaft based on the bending load amount detected by the bending load detector, the vehicle speed value of the vehicle speed sensor when this bending load amount is detected, and the twisting torque values from the first detection coil and the second detection coil when this bending load amount is detected.

According to an embodiment of the present invention, the assist characteristic deciding portion determines the vehicle operating condition based on the bending load amount detected by the bending load detector, a vehicle speed value detected by a vehicle speed sensor for detecting vehicle speed, the twisting torque values from the first detection coil and the second detection coil, and a tilt angle value from a tilt angle sensor for detecting a vehicle tilt angle to adjust the assist amount for the steering shaft according to this determination state and perform damper feel control.

According to an embodiment of the present invention, the bending load amount acting on the steering shaft can be quantitatively detected only by the magnetostrictive torque sensor, thereby eliminating the need to separately provide a bending load detecting sensor and allowing miniaturization of the vehicle and a reduction in the production costs. More specifically, the characteristic curves have the properties that, even when a bending load is applied, there is little characteristic change in the ranges having the gradually decaying curve shape on the initial characteristic curves stored in the storage unit, and therefore can be utilized as absolute values for use in uniquely obtaining twisting torque from the detection values of the first detection coil and the second detection coil. Thus, each value in the ranges having the gradually decaying curve shape can be used as the basis for detecting a twisting torque. Also, each initial detection value of the first detection coil and the second detection coil under no-bending-load condition is obtained from the initial characteristic curve as a storage value corresponding to this twisting torque, and a comparison can be made in terms of the difference between the initial detection value and the actual measurement value, thereby allowing the determination whether or not the steering shaft is subjected to bending and the measurement of the bending load amount, without the need to separately provide a bending load detecting sensor. Thus, miniaturization of the vehicle and a reduction in production costs can be realized.

According to an embodiment of the present invention, the assist characteristics for the electric power steering device according to operating conditions can be obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
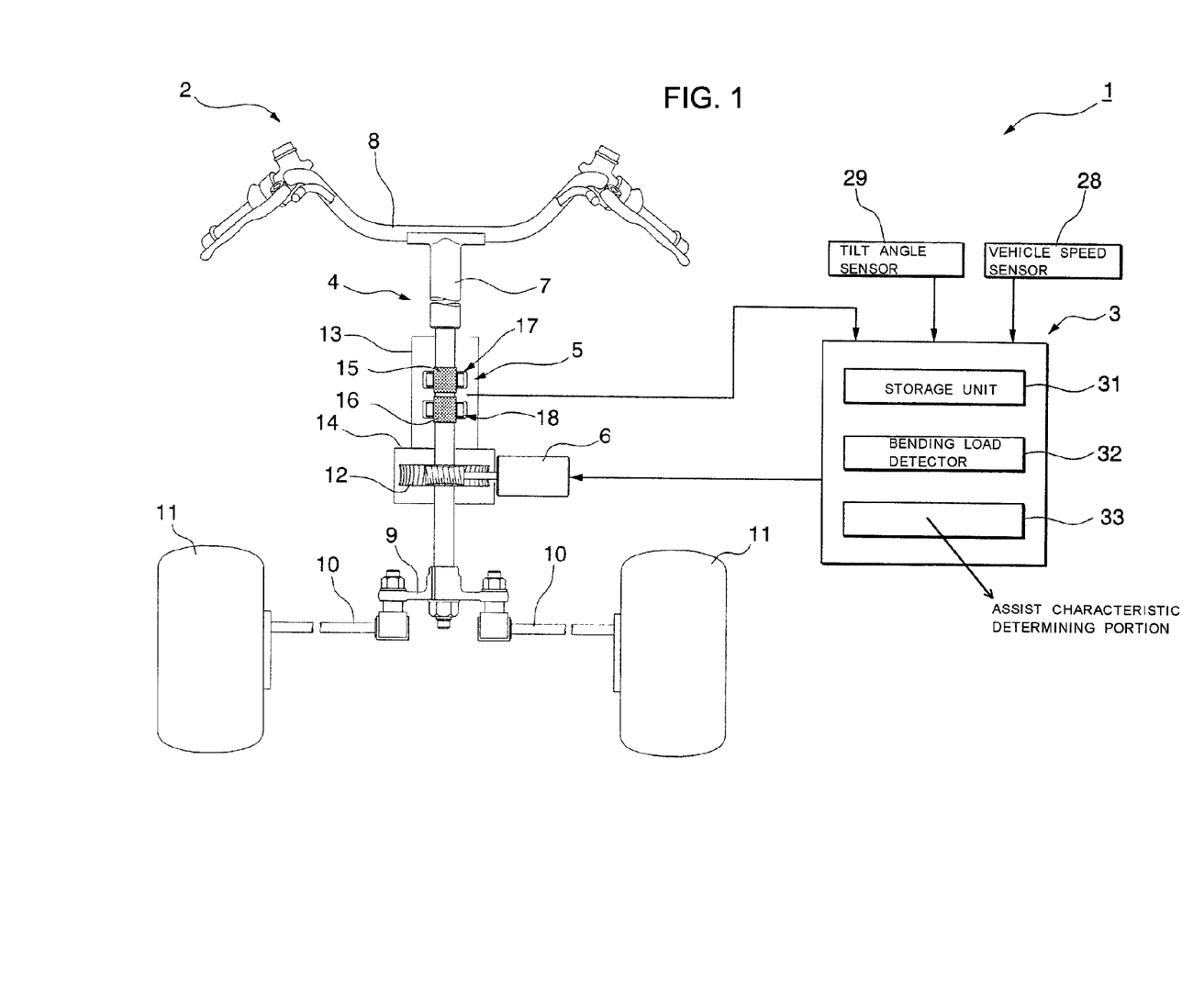
FIG. 1 is a diagram showing the configuration of an electric power steering system including a control unit according to an embodiment of the present invention.

Hereinafter, an embodiment of the present invention will be described with reference to the accompanying drawings. FIG. 1 shows the configuration of an electric power steering system 1 including a control unit according to this embodiment. In this embodiment, the electric power steering system 1 is mounted on a so-called all-terrain vehicle (ATV), and is composed of an electric power steering device 2 and an ECU 3 serving as a control unit for controlling the electric power steering device 2.

As shown in FIG. 1, the electric power steering device 2 is provided with a steering system 4, a magnetostrictive torque sensor 5, and an electric motor 6. The steering system 4 includes a steering shaft 7 rotatably supported by a body frame that is not shown, a steering wheel 8 provided on an upper end of the steering shaft 7, a pitman arm 9 provided on a lower end of the steering shaft 7, and a tie rod 10 provided at both ends of the pitman arm 9. Front wheels 11 are coupled to the respective tie rods 10 so that the steering force from the steering wheel 8 is transmitted to the front wheels 11 through the steering shaft 7 and the tie rods 10.

A worm wheel 12 is provided on a lower portion of the steering shaft 7, and the electric motor 6 for imparting assist force to the steering shaft 7 is disposed adjacent to the worm wheel 12. The magnetostrictive torque sensor 5 is provided for detecting the twisting torque acting on the steering shaft 7, and is disposed above the electric motor 6 and the worm wheel 12. The magnetostrictive torque sensor 5 is accommodated in a sensor housing 13, and the electric motor 6 is fixed to a reduction gear case 14 for covering the worm wheel 12.

Figure 2:
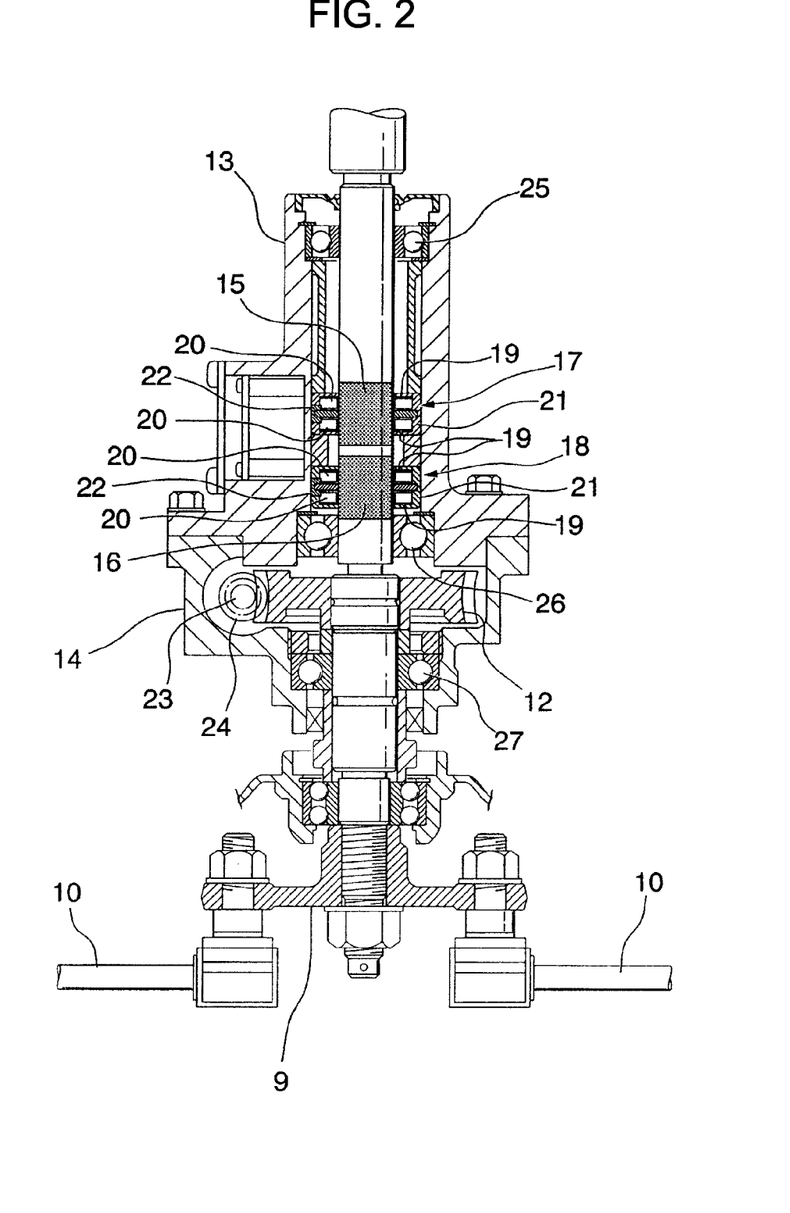
FIG. 2 is a sectional view of the periphery of a magnetostrictive torque sensor of an electric power steering device according to the embodiment of the present invention.

As shown in FIG. 2, the magnetostrictive torque sensor 5 includes a first magnetostrictive film 15 and a second magnetostrictive film 16 formed on the steering shaft 7 and vertically aligned, and a first pair of detection coils 17 and a second pair of detection coils 18 provided around the first magnetostrictive film 15 and the second magnetostrictive film 16, respectively. The first magnetostrictive film 15 and the second magnetostrictive film 16 are each annularly formed over the whole circumference on an outer peripheral surface of the steering shaft 7, and made of a magnetostrictive film with a magnetostrictive property changed according to torque, such as an Ni—Fe-based alloy film formed by vapor plating. The first magnetostrictive film 15 and the second magnetostrictive film 16 have magnetic anisotropic properties opposite in direction to each other. The magnetostrictive direction of the second magnetostrictive film 16 is different from that of the first magnetostrictive film 15.

More specifically, for example, the magnetostrictive direction of the first magnetostrictive film 15 has an angle of 45 degrees with respect to the axial direction of the steering shaft 7, while the magnetostrictive direction of the second magnetostrictive film 16 has an angle of −45 degrees with respect to the axial direction of the steering shaft 7 so that different impedances are outputted from the first detection coil 17 and the second detection coil 18.

The first detection coil 17 and the second detection coil 18 are each composed of upper and lower coil bobbins 19, four in total, allowing the steering shaft 7 to pass through; coils 20 wound on the respective coil bobbins 19; and two pairs of upper and lower magnetic yokes 21 for accommodating the coil bobbins 19 and the coils 20, and are accommodated in the sensor housing 13 formed into a cylindrical shape in such a manner so as to surround the steering shaft 7 and elongated in the axial direction of the steering shaft 7. The sensor housing 13 holds the yokes 21 with the outer periphery of each yoke 21 abutting on an inner peripheral surface of the sensor housing 13 to position the coils 20 around the first magnetostrictive film 15 and the second magnetostrictive film 16. Two pairs of upper and lower couplers 22 are provided on the coils 20 so that detection signals from the coils 20 are extracted through these couplers 22.

The reduction gear case 14 has a box shape for covering the worm wheel 12 provided on the steering shaft 7 while covering the steering shaft 7, and the electric motor 6 is fixed to an outer wall surface thereof. The electric motor 6 is fixed to the reduction gear case 14, with a shaft portion 23 of the electric motor 6 extending to the inside of the reduction gear case 14, and a worm gear 24 provided on a leading end of the shaft portion 23 is brought into a meshing engagement with the worm wheel 12. Thus, the assist force from the drive motor 6 is imparted to the steering shaft 7. Also, the sensor housing 13 includes bearings 25 and 26 for rotatably supporting the steering shaft 7 at upper and lower portions thereof, respectively, and the reduction gear case 14 includes a bearing 27 for rotatably supporting the steering shaft 7 at a lower portion thereof.

As shown in FIG. 1, the ECU 3 is electrically connected to the magnetostrictive torque sensor 5 and the electric motor 6, and also is electrically connected to a vehicle speed sensor 28 for detecting vehicle speed and a tilt angle sensor 29 for detecting a vehicle tilt angle. The ECU 3 detects a bending load amount based on a twisting torque detection signal from the magnetostrictive torque sensor 5, and can output a predetermined control signal to the electric motor 6 using an assist characteristic deciding portion 33 based on the twisting torque, the bending load amount, the vehicle speed value from the vehicle speed sensor 28, and the tilt angle value from the tilt angle sensor 29.

The ECU 3 includes a storage unit 31, a bending load detector 32, and the assist characteristic deciding portion 33. The storage unit 31 is typically composed of storage means such as a ROM, and stores, as an initial characteristic curve formed from initial detection values, a characteristic curve formed from detection values of each of the first detection coil 17 and the second detection coil 18 when only twisting torque is applied to the steering shaft 7. It should be noted that the detection values of the first detection coil 17 and the second detection coil 18 when only twisting torque is applied to the steering shaft 7, are referred to as "initial detection values", as described above, and a curve plotted in coordinates from these initial detection values is referred to as an initial characteristic curve.

Figure 3:
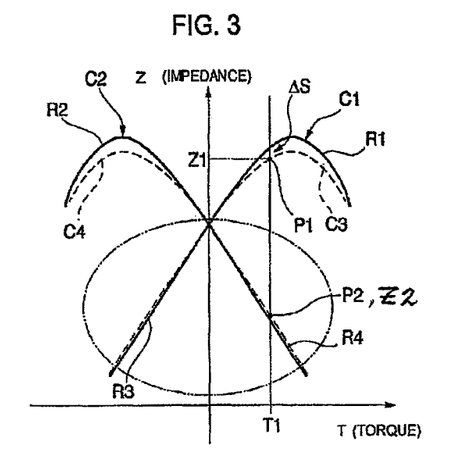
FIG. 3 is a diagram for explaining initial characteristic curves stored in a storage unit of an ECU according to the embodiment of the present invention.

FIG. 3 conceptually shows the initial characteristic curves stored in the storage unit 31. In FIG. 3, the horizontal axis represents the torque (T) added to the steering shaft 7 and the vertical axis represents the impedance (Z) of the first detection coil 17 and the second detection coil 18 outputted by the added torque. In FIG. 3, it is to be noted that C1 denotes the initial characteristic curve of the first detection coil 17, and C2 denotes the initial characteristic curve of the second detection coil 18. As is clear from FIG. 3, when twisting torque is applied in one direction from a neutral position of the steering shaft, the initial characteristic curves C1 and C2 have a convex curve shape (ranges R1 and R2) that reaches a peak at a predetermined torque, on the other hand, when twisting torque is applied in the other direction from the neutral position of the steering shaft 7, the initial characteristic curves C1 and C2 have a gradually decaying curve shape (ranges R3 and R4). Furthermore, since the first magnetostrictive film 15 and the second magnetostrictive film 16 have mutually different magnetostrictive directions (more correctly, in a symmetrical manner), the initial characteristic curves C1 and C2 have opposite characteristics with detection values symmetrical with respect to the neutral position of the steering shaft 7.

The bending load detector 32 is designed to detect the bending load amount with reference to the above-described initial characteristic curves C1 and C2. The bending load detector 32 detects a twisting torque corresponding to each detection value detected by the first detection coil 17 and the second detection coil 18 from the range R3 or R4 having the gradually decaying curve shape on one of the initial characteristic curve C1 of the first detection coil 17 and the initial characteristic curve C2 of the second detection coil 18, and obtains an initial detection value corresponding to the detected twisting torque from the range R3 or R4 as described above from the range R1 or R2 having the upwardly convex curve shape on the other initial characteristic curve C1 or C2 to detect the bending load amount based on a difference between the initial detection value and the detection value (actual measurement value) detected by the first detection coil 17 or the second detection coil 18.

This bending load detector 32 is designed to detect the generation of a bending load and a bending load amount, by utilizing the properties that, in the case where a bending load is applied to the steering shaft 7, there is little difference between the initial detection value Z1, Z2 and the actual measurement values P1, P2 in the ranges R3 and R4 having the gradually decaying curve shape on the initial characteristic curves C1 and C2, while there is a greater difference ΔS there between in the ranges R1 and R2 having the upwardly convex curve shape. Referring to FIGS. 3, C3 and C4 show actual characteristic curves (actual characteristic curves C3, C4 under bending load) formed from respective detection values of the first detection coil 17 and the second detection coil 18 with twisting torque applied in a state in which a bending load is applied to the steering shaft 7. As can be seen when compared with the initial characteristic curves C1 and C2, the actual characteristic curves C3 and C4 have the above-described properties, that is, there is little difference between the initial detection values Z1, Z2 and the actual measurement value values P1, P2 in the ranges R3 and R4 (the range enclosed by the chain double-dashed line) having the gradually decaying curve shape on the initial characteristic curves C1 and C2, respectively, while there is a difference therebetween in the ranges R1 and R2 having the upwardly convex curve shape.

More specifically, as shown in FIG. 3, for example, when an actual detection (measurement) value indicated by P1 is detected in the first detection coil 17 and a an actual detection (measurement) value indicated by P2 is detected in the second detection coil 18. The bending load detector 32 detects a twisting torque T1 corresponding to the actual detection (measurement) value P2 detected by the second detection coil 18 with reference to the range R4 having the gradually decaying curve shape on the initial characteristic curve C2 of the second detection coil 18, and then obtains an initial detection value Z1 with reference to the range R1 having the upwardly convex curve shape on the initial characteristic curve C1 corresponding to the twisting torque T1 to perform a comparison between the initial detection value Z1 and the actual measurement value P1 detected by the first detection coil 17 (on initial characteristic curve C1). Thereafter, if in the above comparison there is a difference ($\Delta S$), the bending load detector 32 determines that a bending load is generated, and detects a bending load amount according to the difference $\Delta S$. It should be noted that the bending load detector 32 calculates the bending load amount according to whether the difference $\Delta S$ is large or small, and modifications of this calculation include a calculation method using a predetermined arithmetic expression, and a calculation method in which the bending load amount according to the difference $\Delta S$ is previously obtained, and this information is stored in the storage unit 31 or the like to perform calculations by comparison and reference.

In addition, based on the bending load amount detected by the bending load detector 32, the vehicle speed value detected by the vehicle speed sensor 28, the twisting torque value from the first detection coil 17 and the second detection coil 18, and the tilt angle value from the tilt angle sensor 29, the assist characteristic deciding portion 33 decides an assist amount for the steering shaft 7 and a damper feel and determines an operating condition to control the damper feel while adjusting the assist amount for the steering shaft 7 according to this determination state.

Figure 4:
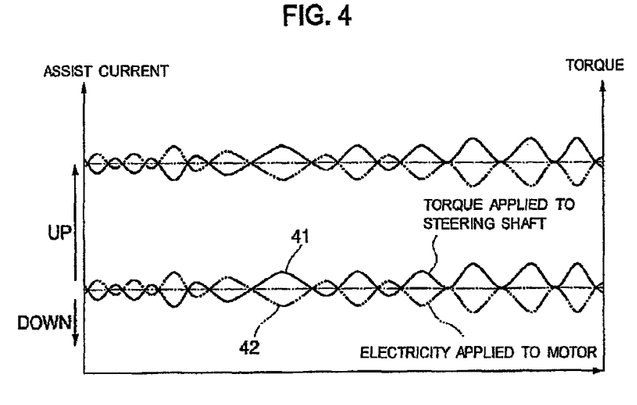
FIG. 4 is a diagram for explaining damper feel control executed by the ECU according to the embodiment of the present invention.

It should be noted that the assist amount serves to facilitate a rotational operation of the steering shaft 7 by an occupant and refers to the level of the output value of the electric motor 6. It also should be noted that the damper feel means preventing the steering shaft 7 from being rotated by an external force (such as a road surface reaction force), and sending, to the electric motor 6, electricity 42 that is in opposite phase to a vibration 41 of the twisting torque applied to the steering shaft 7 so as to cancel out this vibration, as shown in FIG. 4. Thus, the electric motor 6 is allowed to finely-operate in the direction opposite to the vibration of the twisting torque, thereby causing hard rotation of the steering shaft 7. The strength of the damper feel is adjusted depending on the amount of power supply. The decision of the damper feel refers to the level of power supply, and the control of a damper feel means adjusting the power supply.

The assist characteristic deciding portion 33 performs the decisions of an assist amount and a damper feel, the determination of an operating condition, adjustment of the assist amount, control of the damper feel based on plural pieces of prestored characteristic information. These pieces of characteristic information are prestored in the storage unit 31.

Figure 5:
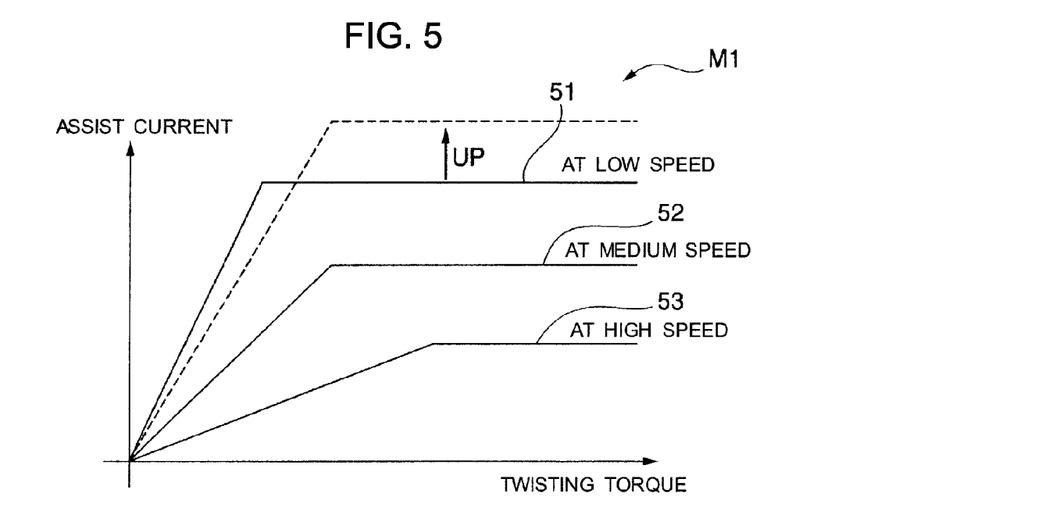
FIG. 5 is a diagram for explaining characteristic information stored in the storage unit according to the embodiment of the present invention.
Figure 6:
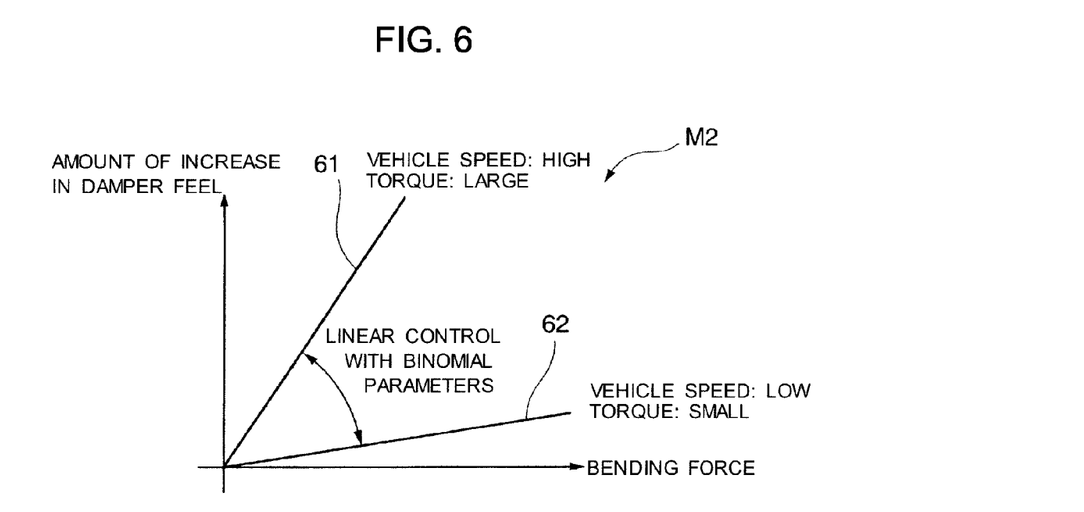
FIG. 6 is a diagram for explaining characteristic information stored in the storage unit according to the embodiment of the present invention.
Figure 7:
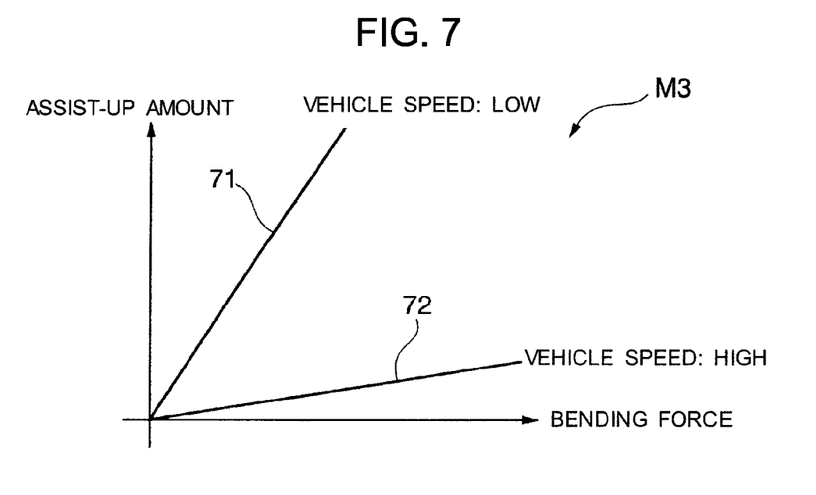
FIG. 7 is a diagram for explaining characteristic information stored in the storage unit according to the embodiment of the present invention.

FIGS. 5 to 8 show various characteristic information (MAP) to which the assist characteristic deciding portion 33 refers. FIG. 5 conceptually shows assist amount characteristic information M1 for use in the decision of the assist amount stored in the storage unit 31; FIG. 6 conceptually shows damper feel characteristic information M2 for use in the control of the damper feel; FIG. 7 conceptually shows assist-up characteristic information M3 for use in the adjustment (increase) of the assist amount; and FIG. 8 conceptually shows assist-down characteristic information M4 for use in the adjustment (decrease) of the assist amount.

Referring to FIG. 5, the assist amount characteristic information M1 is information for use in setting an assist current according to the twisting torque and the vehicle speed. The assist amount characteristic information M1 includes low-speed assist characteristic information 51 that specifies an assist amount according to the twisting torque during low-speed operating; medium-speed assist characteristic information 52 that specifies an assist amount according to the twisting torque during medium-speed operating; and high-speed assist characteristic information 53 that specifies an assist amount according to the twisting torque during high-speed operating.

In this example, the assist amounts of the high-speed assist characteristic information 53, the medium-speed assist characteristic information 52, and the low-speed assist characteristic information 51 are set to increase in this order. Also, in each of the low-, medium-, and high-speed characteristic information, the assist amount is set to gradually increase according to the twisting torque in a relatively small range of the twisting torque, while the assist amount is set constant in a relatively large range of the twisting torque. Further, threshold value ranges set as the relatively small ranges of the twisting torque, vary among the low, medium, and high speeds. In this embodiment, the assist characteristic deciding portion 33 has the respective threshold value ranges for determining the low, medium, and high speeds based on the vehicle speed value (for example, the low speed is equal to or higher than 0 km/h and below 10 km/h, and the medium speed is equal to or higher than 10 km/h and below 20 km/h). The assist characteristic deciding portion 33 determines these three types and then refers to the assist amount characteristic information M1 to decide the assist amount.

Referring to FIG. 6, the damper feel characteristic information M2 is information for use in setting the strength of the damper feel according to the vehicle speed, the twisting torque, and the bending load amount (bending force). In this damper feel characteristic information M2, the setting is made such that the higher the vehicle speed value, the larger the degree of increase in the damper feel, while the lower the vehicle speed value, the smaller the degree of increase in the damper feel. In other words, there are set a determination threshold value 61 (for example, 30 km/h or more) as a high vehicle speed value and a determination threshold value 62 (for example, equal to or higher than 0 km/h and below 5 km/h) as a low vehicle speed value, and the setting is made such that the higher the vehicle speed value, the larger the amount of increase in the damper feel with respect to the bending load amount. Also, the setting is made such that the larger the bending load amount, the more the damper feel (the larger the amount of increase in the damper feel). In this embodiment, the assist characteristic deciding portion 33 sets the strength of the damper feel based on the vehicle speed value, the twisting torque value, and the bending load amount (bending force), with reference to the damper feel characteristic information M2. It should be noted that as for speed values between the determination threshold values 61 and 62, the assist characteristic deciding portion 33 linearly calculates the values between the determination threshold values 61 and 62 with the vehicle speed value and the bending load amount as binomial parameters to set the strength of the damper feel.

Referring to FIG. 7, the assist-up characteristic information M3 is information for use in setting the assist-up amount according to the vehicle speed and the bending load amount (bending force). In this assist-up characteristic information M3, the setting is made such that the lower the vehicle speed value, the larger the degree of increase in the assist-up amount, while the higher the vehicle speed value, the smaller the degree of increase in the assist-up amount. In other words, there are set a determination threshold value 71 (for example, equal to or higher than 0 km/h and below 5 km/h) as a low vehicle speed value and a determination threshold value 72 (for example, 30 km/h or more) as a high vehicle speed value, and the setting is made such that the lower the vehicle speed value, the more the increase in the assist-up amount with respect to the bending load amount. Also, the setting is made such that the larger the bending load amount, the larger the assist-up amount.

It should be noted that the assist-up characteristic information M3 is referred to by the assist characteristic deciding portion 33 when the twisting torque is relatively large. When the twisting torque is relatively large, the vehicle speed is low, and the bending load is large, the vehicle is likely to be in an operating condition such as the condition of "downhill road" operation, "stationary swing," or "bank road (reverse steering)" operation. On the other hand, when the vehicle speed is high and the bending load is large, the vehicle is likely to be in an operating condition such as the condition of "rough road operating," "full braking," or "jump". Therefore, in the assist-up characteristic information M3, the setting is made such that when the vehicle speed is low and the bending load amount is large, the assist amount is increased to a large degree, while, when the vehicle speed is high and the bending load amount is small, the assist amount is increased to a small degree.

Figure 8:
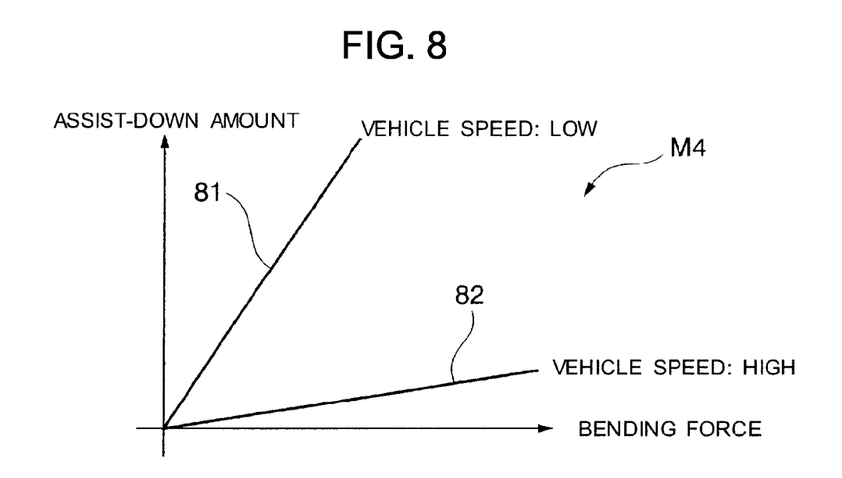
FIG. 8 is a diagram for explaining characteristic information stored in the storage unit according to the embodiment of the present invention.

In addition, referring to FIG. 8, the assist-down characteristic information M4 is information for use in setting the assist-down amount according to the speed value and the bending load amount (bending force). In this assist-down characteristic information M4, the setting is made such that the lower the vehicle speed value, the larger the degree of increase in the assist-down amount, while the higher the vehicle speed value, the smaller the degree of increase in the assist-down amount. In other words, a determination threshold value 81 is set (for example, equal to or higher than 0 km/h and below 5 km/h) as a low vehicle speed value and a determination threshold value 82 is set (for example, 30 km/h or more) as a high vehicle speed value, and the settings are made such that the lower the vehicle speed value, the more the increase in the assist-down amount with respect to the bending load amount. Also, the setting is made such that the larger the bending load amount, the larger the assist-down amount.

It should be noted that the assist-down characteristic information M4 is referred to by the assist characteristic deciding portion 33 when the twisting torque is relatively small. When the twisting torque is relatively small, the vehicle speed is low, and the bending load is large, the vehicle is likely to be in an operating condition such as the condition of an "uphill road" operation or a "bank road (normal steering)" operation. Therefore, in the assist-down characteristic information M4, the setting is made such that when the vehicle speed is low and the bending load amount is large, the assist amount is decreased to a large degree, while, when the vehicle speed is high and the bending load amount is small, the assist amount is decreased to a small degree. In this embodiment, the assist characteristic deciding portion 33 determines whether the twisting torque is high or low, and then refers to the assist-up characteristic information M3 or the assist-down characteristic information M4 to set the assist-up amount or the assist-down amount based on the vehicle speed value and the bending load amount (bending force). It should be noted that as for speed values between the determination threshold value 71 (81) and the determination threshold value 72 (82), the assist characteristic deciding portion 33 linearly calculates the values between the determination threshold values 71(81) and 72(82) with the vehicle speed value and the bending load amount as binomial parameters to set the assist-up amount and the assist-down amount. It should be noted that, referring to FIGS. 4 and 5, the assist-up correction means increasing the output of the assist current in the direction of arrow UP, while the assist-down correction means decreasing the output of the assist current in the direction of arrow DOWN.

Next, one example of the assist control for the electric power steering device 2 by the ECU 3 configured as above will be described with reference to the flowchart shown in FIG. 9.

In step S1, the ECU 3 reads a vehicle speed value from the vehicle speed sensor 28, and also reads a twisting torque value from the magnetostrictive torque sensor 5. In step S2, an assist amount and a damper feel are decided by the assist characteristic deciding portion 33. It should be noted that the assist characteristic deciding portion 33 decides the assist amount by comparing the vehicle speed value and twisting torque value read in step S1 with the assist amount characteristic information M1 shown in FIG. 5, and as for the damper feel, sets a predetermined electric power value.

In step S3, the ECU 3 reads a bending load using the bending load detector 32 to determine in step S4 whether or not bending is detected. If bending is detected, the process goes to step S5. If not detected, the process ends and is again repeated from step S1. Thereafter, in step S5, the ECU 3 reads the vehicle speed value and the twisting torque when the bending load is detected, and in step S6, performs a damper feel correction using the assist characteristic deciding portion 33. It should be noted that the assist characteristic deciding portion 33 performs the damper feel correction by comparing the vehicle value and twisting torque read in step S5 with the damper feel characteristic information M2 shown in FIG. 6.

In step S7, the ECU 3 determines, using the assist characteristic deciding portion 33, whether the twisting torque read in step S5 is higher or lower than a predetermined twisting torque value. If the twisting torque is higher, the process goes to step S8, on the other hand, if the twisting torque is below the predetermined twisting torque, the process goes to step S9. It should be noted that the determination threshold value of the predetermined twisting torque value changes depending on vehicle speed and such information is also stored in the storage unit 31.

Thereafter the ECU 3 performs, using the assist characteristic deciding portion 33, a correction for the increase in assist amount in step S8, and a correction for the decrease in assist amount in step S9. It should be noted that the assist characteristic deciding portion 33 refers, in step S8, to the assist-up characteristic information M3 shown in FIG. 7, and refers, in step S9, to the assist-down characteristic information M4 shown in FIG. 8 to decide an amount of assist adjustment.

The foregoing embodiment of the present invention includes the bending load detector 32 provided in the ECU 3, for storing, in the storage unit 31 provided in the ECU 3, as the initial characteristic curves C1 and C2 formed from the initial detection values, the characteristic curves formed from respective detection values of the first detection coil 17 and the second detection coil 18 when only twisting torque is applied to the steering shaft 7, and detecting the bending load amount acting on the steering shaft 7 based on the differences between the detection values detected by the first detection coil 17 and the second detection coil 18, and the initial detection values on the initial characteristic curves C1 and C2 corresponding to the respective detection values. Thus, the bending load amount can be quantitatively detected only by the magnetostrictive torque sensor 5, thereby eliminating the need to separately provide a bending load detecting sensor and allowing miniaturization of the vehicle and a reduction in production costs.

In addition, this embodiment includes the assist characteristic deciding portion 33 that detects an operating condition of the vehicle based on the bending load amount detected by the bending load detector 32, or the like, and adjusts the assist amount for the steering shaft 7 according to this determination state. Thus, the assist characteristics for the electric power steering device 2 according to operating conditions can be properly obtained.

Next, a modification of the process of the ECU 3 will be described with reference concurrently to the flowcharts shown in FIGS. 10 and 11. In this process, firstly in step S21, the ECU 3 reads a vehicle speed value from the vehicle speed sensor 28, and also reads a twisting torque value from the magnetostrictive torque sensor 5. In step S22, an assist amount and a damper feel are decided by the assist characteristic deciding portion 33. It should be noted that the assist characteristic deciding portion 33 decides the assist amount by comparing the vehicle speed value and twisting torque value read in step S21 with the assist amount characteristic information M1 shown in FIG. 5, and as for the damper feel, sets a predetermined electric power value.

In step S23, the ECU 3 reads a bending load using the bending load detector 32 to determine whether or not bending is detected. If bending is not detected, the process returns to step S21. If bending is detected, the process goes to step S24. In step S24, it is detected whether or not the vehicle is moving. If the vehicle is moving, the process goes to step S25. If the vehicle is not moving, the process goes to step S26. In step S26, the ECU 3 performs, using the assist characteristic deciding portion 33, a correction for the increase in assist amount. The reason for this increase in assist amount is because of the presumption that the vehicle is in a stationary swing condition.

In step S25, the ECU 3 determines whether or not the vehicle speed is high, on the basis of whether or not the vehicle speed is higher than a predetermined vehicle speed value. If the vehicle speed is high, the process goes to step S29 shown in FIG. 11. If not, the process goes to step S27. In step S27, whether or not the vehicle speed is medium is determined on the basis of whether or not the vehicle speed is higher than a predetermined vehicle speed value. If the vehicle speed is medium, the process goes to step S28. If not, it is determined that the vehicle speed is low, and the process goes to step S34 shown in FIG. 11.

After the determination that the vehicle speed is high, the ECU 3 determines in step S29 whether or not the bending load is "large," on the basis of whether or not the bending load is higher than a predetermined value. If the bending load is "large," the process goes to step S30. If not, the process goes to step S31. In step S31, whether or not the bending load is "moderate" is determined on the basis of whether or not the bending load is higher than a predetermined value. If the bending load is "moderate," the process goes to step S32. If not, it is determined that the bending load is small, the process goes to step S33.

After the determination that the bending load is "large", the ECU 3 performs in step S30, using the assist characteristic deciding portion 33, a correction for increasing the damper feel. After the determination that the bending load is "moderate," the ECU 3 performs in step S32 a correction for slightly increasing the damper feel. After the determination that the bending load is small, a normal characteristic is maintained in step S33. It should be noted that, in this modification, when the bending load is "large," the vehicle is presumed to be in a condition such as jump or landing, and the damper feel is increased. When the bending load is "moderate," the vehicle is presumed to be in a condition such as full braking, and the damper feel is slightly increased. After the above damper feel correction, the process is again repeated from step S21.

On the other hand, in step S28, after it is determined in step S27 that the vehicle speed is medium, both of the assist amount and the damper feel are linearly controlled. This is the same manner as the process shown in FIG. 9 based on the damper feel characteristic information M2, the assist-up characteristic information M3, and the assist-down characteristic information M4 shown in FIGS. 6 to 8 in which the twisting torque is also referred to.

After the determination that the vehicle speed is not medium, the ECU 3 determines in step S34 (FIG. 11) whether or not the bending load is "large," on the basis of whether or not the bending load is higher than a predetermined value. If the bending load is "large," the process goes to step S35. If not, the process goes to step S36. In step S36, whether or not the bending load is "moderate" is determined on the basis of whether or not the bending load is higher than a predetermined value. If the bending load is "moderate," the process goes to step S37. If not, it is determined that the bending load is small and the process goes to step S38.

After the determination that the bending load is "large," the ECU 3 performs in step S35, using the assist characteristic deciding portion 33, a correction for increasing the assist amount to a small degree. After the determination that the bending load is "moderate," a normal characteristic is maintained in step S37. After the determination that the bending load is "small," the ECU 3 performs in step S38 a correction for increasing the assist amount to a slightly large degree. It should be noted that, in this modification, when the bending load is "large," the vehicle is presumed to be operating on a uphill road, a downhill road or a bank road, and a correction for increasing the assist amount to a small degree is performed. Here, after this assist amount correction, the process is again repeated from step S21. Through the foregoing process, the assist characteristics for the electric power steering device 2 according to operating conditions can be also properly obtained.

Figure 12:
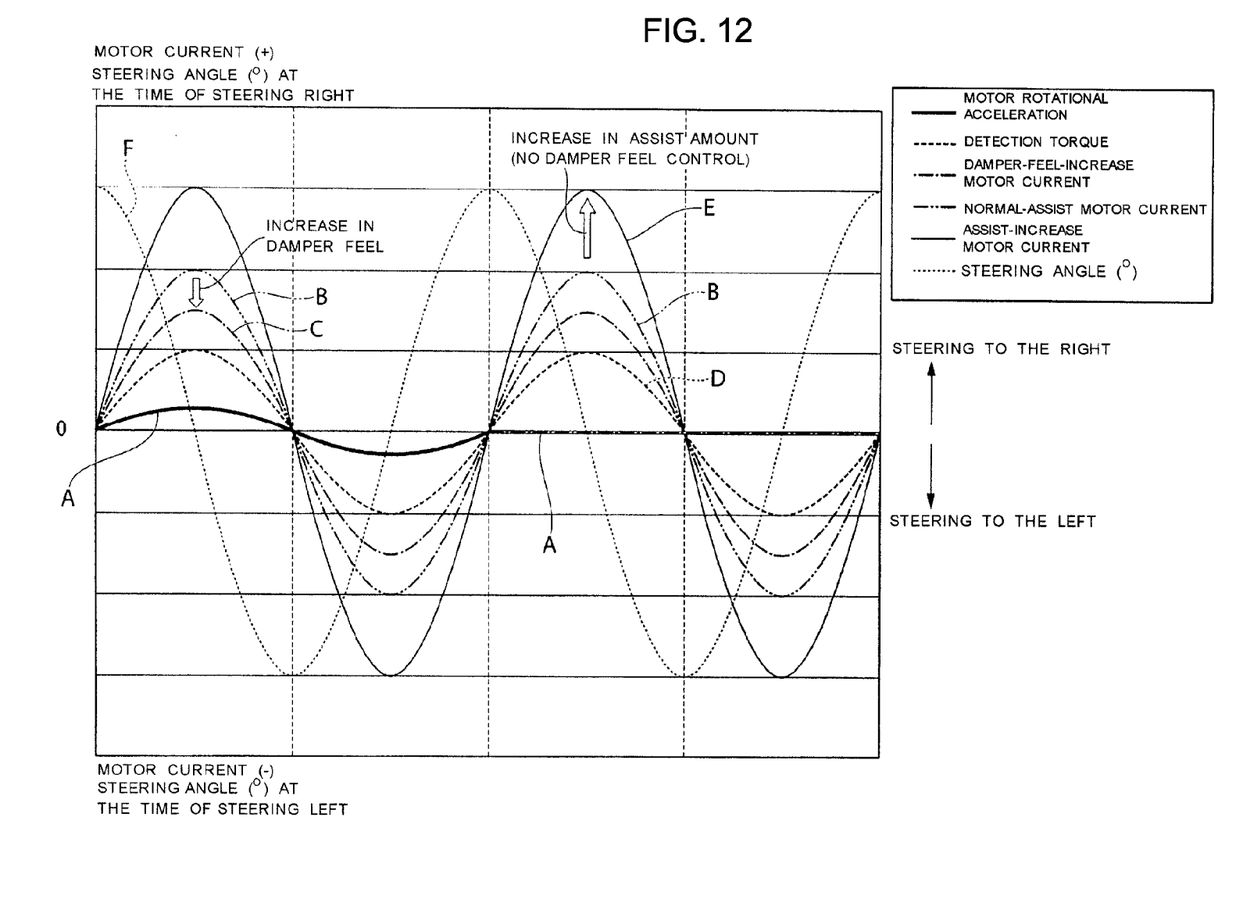
FIG. 12 is a flowchart for explaining yet another example of the control for the electric power steering device executed by the ECU.

Next, another modification of the process of the ECU 3 will be described. In this process, motor rotational acceleration caused by a reaction force applied to the electric motor 6 is detected. When the absolute value of the detection value is larger than a predetermined value (or equal to or more than a predetermined value), reduction control of the current value for the electric motor 6 is performed, thereby creating a damper feel. On the other hand, when the absolute value of the detected motor rotational acceleration is equal to or less than a predetermined value (or smaller than a predetermined value), the current value for the electric motor 6 is increased according to the twisting torque to increase the assist current. Furthermore, in this process, as for the damper feel, the current decrease amount is adjusted, and as for the increase in assist amount, the current increase amount is adjusted, according to the steering angle of the steering wheel.

To be more specific, referring to FIG. 12, looking at the left half area on the drawing sheet, the motor rotational acceleration is detected as indicated by line A (a solid heavy line) in FIG. 12, and assume that this detection value is larger than a predetermined value. In this case, in this process, the normal assist current for the electric motor 6 as indicated by line B (a chain double-dashed line) in FIG. 12 is decreased as indicated by a down-pointing arrow (increase in damper feel) on the drawing sheet, and therefore the current (damper-feel-increase motor current) indicated by line C (a chain line) in FIG. 12 is outputted to the electric motor 6, so that the damper feel is provided. On the other hand, looking at the right half area on the drawing sheet, when the motor rotational acceleration is "0," the normal assist current B is increased as indicated by an up-pointing arrow (increase in assist amount) on the drawing sheet according to the detection torque (twisting torque) indicated by D (a dotted line) in FIG. 12, and therefore the current (assist-increase motor current) indicated by line E (a solid line, a thin line) in FIG. 12 is outputted to the electric motor 6, so that the damper feel control is not performed. In addition, in FIG. 12, line F denotes the steering angle of the steering wheel, in which the upper side on the drawing sheet denotes the displacement angle at the time of steering to the right, while the lower side on the drawing sheet denotes the displacement angle at the time of steering to the left. As can be seen when comparing the line F with the lines B, C, and E, as the steering wheel is closer to a neutral position, the current decrease amount for the case of the damper feel control and the current increase amount for the case of the increase in assist amount are made larger. As the steering wheel is closer to steering limit positions, the current decrease amount for the case of the damper feel control and the current increase amount for the case of the increase in assist amount are made smaller.

As the assist current and damper feeling deciding processing of the ECU 3, this processing may be employed. After that, alternatively, the decided assist current may be adjusted according to the bending load. It should be noted that in FIG. 12, the vertical axis represents the motor current and the steering angle of the steering wheel and serves as an index of the lines B, C, D, and F, and the lines A and D are shown for the convenience of the description taken in connection with the lines B, C, D, and F.

Figure 9:
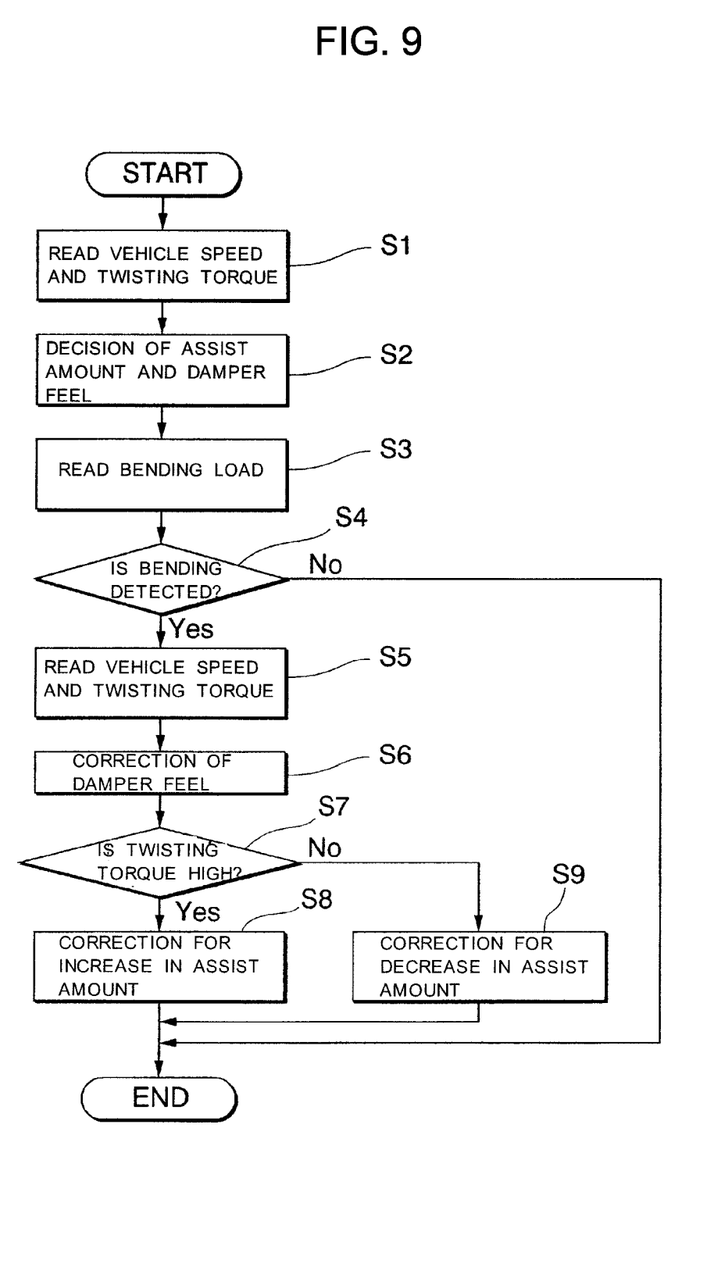
FIG. 9 is a flowchart for explaining one example of the control for the electric power steering device executed by the ECU according to the embodiment of the present invention.
Figure 10:
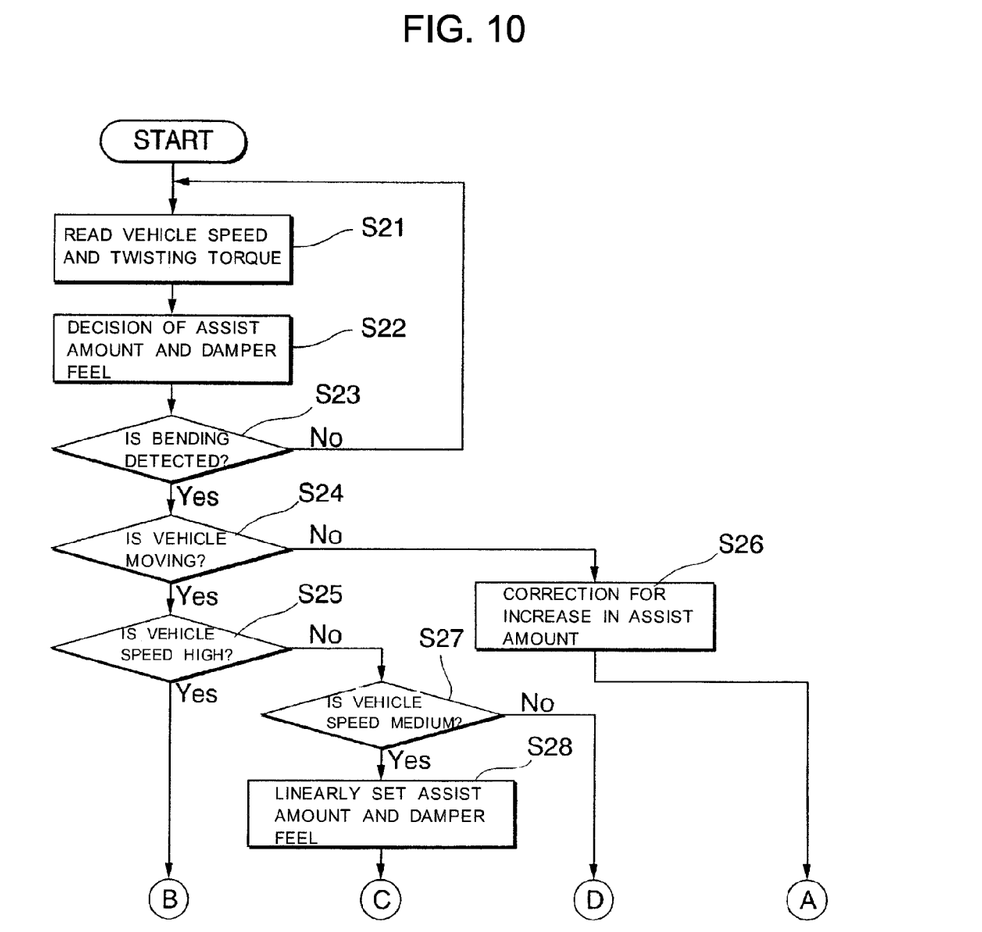
FIG. 10 is a flowchart for explaining another example of the control for the electric power steering device executed by the ECU.
Figure 11:
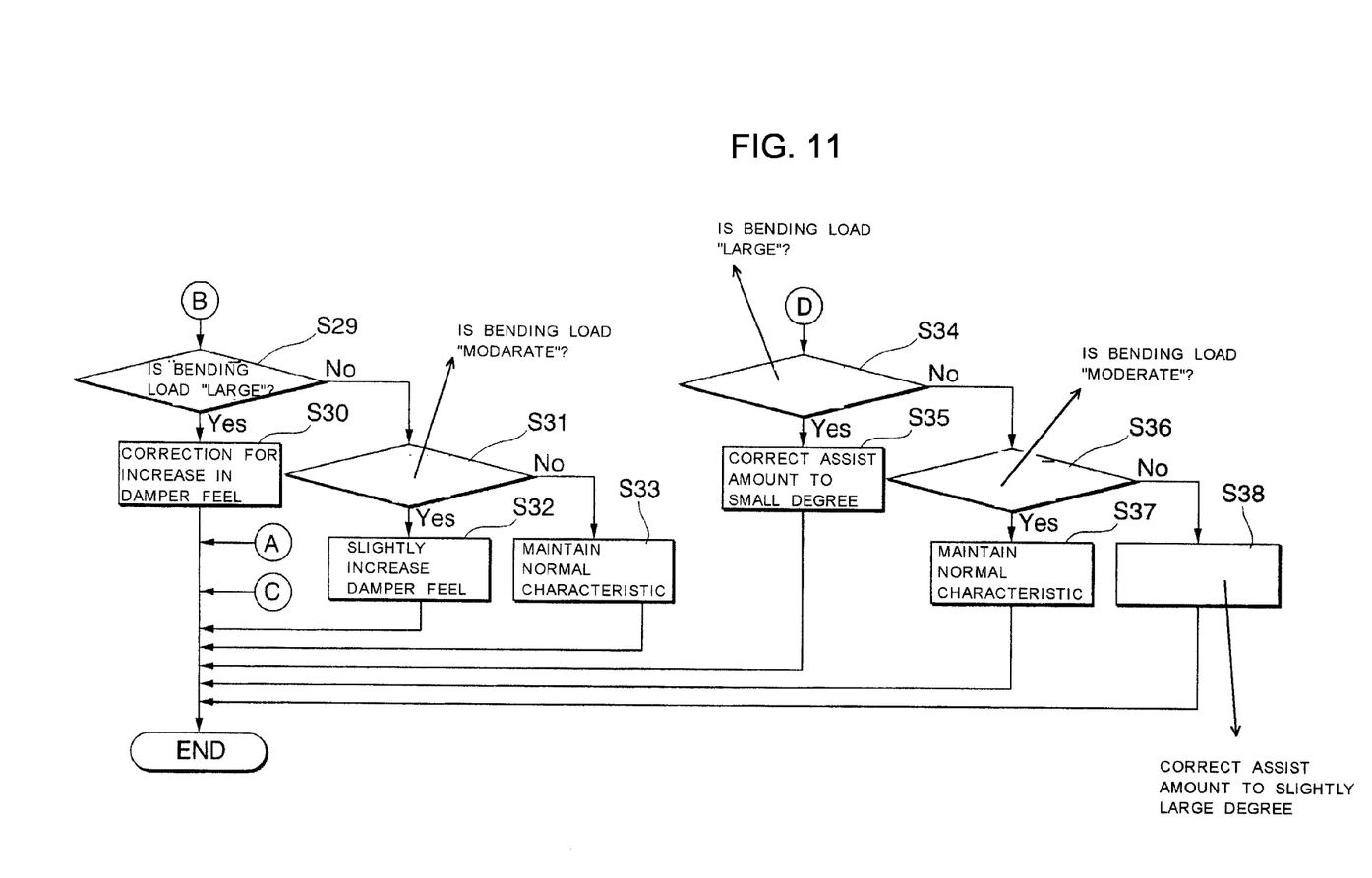
FIG. 11 is a flowchart for explaining still another example of the control for the electric power steering device executed by the ECU.

While it has been described in the foregoing embodiment that in the processes of the ECU 3 described using FIGS. 9, 10, and 11, the assist characteristic is decided out of consideration of the tilt angle value of the tilt angle sensor 29. However, since the determination of the operating condition including the tilt angle value allows still further fragmentation of the operating condition, thereby enabling high-precision control of the assist amount and the damper amount according to the operating condition. In concrete terms, if the operating conditions, such as whether on a uphill road or a downhill road, are determined based on the tilt angle value, further high-precision assist characteristic can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control unit for an electric power steering device provided with
   a first magnetostrictive film and a second magnetostrictive film with magnetic anisotropic properties opposite in direction to each other, each formed circumferentially on a surface of a steering shaft, and
   a first detection coil and a second detection coil provided around the first magnetostrictive film and the second magnetostrictive film, respectively, for detecting a twisting torque applied to the steering shaft based on an actual detection value of each of the first detection coil and the second detection coil to adjust an assist amount for the steering shaft,
   the control unit further comprising:
   a storage unit for storing
      an initial characteristic curve C1 formed from an initial detection value Z1 of the first detection coil when only the twisting torque T1 is applied to the steering shaft, and an initial characteristic curve C2 formed from an initial detection value Z2 of the second detection coil when only the twisting torque T1 is applied to the steering shaft; and
      a characteristic curve C3 being formed from the actual detection value P1 of first detection coil, and a characteristic curve C4 being formed from the actual detection value P2 of the second detection coil; and
   a bending load detector for detecting the bending load amount acting on the steering shaft based on
      a difference ΔS between the actual detection value P1 on the characteristic curve C3 and the initial detection value Z1 on the initial characteristic curve C1, and on
      a difference ΔS between the actual detection value P2 on the characteristic curve C3 and the initial detection value Z2 on the initial characteristic curve C2.

2. The control unit for the electric power steering device according to claim 1, wherein, when the twisting torque T1 is applied in one direction from a neutral position of the steering shaft, each of the initial characteristic curves C1, C2 has an upwardly convex curve shape that reaches a peak at a predetermined torque T1,
   on the other hand, when the twisting torque T1 is applied in an opposite direction from the neutral position of the steering shaft, each of the initial characteristic curves C1, C2 has a gradually decaying curve shape,
   wherein the initial characteristic curves C1, C2 of the first detection coil and the second detection coil have opposite characteristics with the initial detection values Z1, Z2 being symmetric with respect to the neutral position of the steering shaft, and
   wherein the bending load detector detects the twisting torque T1 corresponding to each of the actual detection values P1, P2 detected by the first detection coil and the second detection coil from a range having the gradually decaying curve shape on one of the initial characteristic curve C1 of the first detection coil and the initial characteristic curve C2 of the second detection coil, and
   obtains each of the initial detection values Z1, Z2 corresponding to the detected twisting torque T1 from a range having the upwardly convex curve shape on the other initial characteristic curve to detect the bending load amount based on the difference ΔS between the initial detection values Z1, Z2 and the actual detection values P1, P2 detected by the first detection coil or the second detection coil.

3. The control unit for the electric power steering device according to claim 1, and further including an assist characteristic deciding portion that determines a vehicle operating condition based on the bending load amount detected by the bending load detector, and adjusts the assist amount for the steering shaft according to the operating condition as determined.

4. The control unit for the electric power steering device according to claim 2, and further including an assist characteristic deciding portion that determines a vehicle operating condition based on the bending load amount detected by the bending load detector, and adjusts the assist amount for the steering shaft according to the operating condition as determined.

5. The control unit for the electric power steering device according to claim 3, wherein the assist characteristic deciding portion determines the vehicle operating condition based on the bending load amount detected by the bending load detector and a vehicle speed value detected by a vehicle speed sensor for detecting vehicle speed, and adjusts the assist amount for the steering shaft according to the operating condition as determined.

6. The control unit for the electric power steering device according to claim 4, wherein the assist characteristic deciding portion determines the vehicle operating condition based on the bending load amount detected by the bending load detector, a vehicle speed value of the vehicle speed sensor when the bending load amount is detected, and the values of the twisting torque T1 from the first detection coil and the second detection coil when the bending load amount is detected, and adjusts the assist amount for the steering shaft according to the operating condition as determined.

7. The control unit for the electric power steering device according to claim 6, wherein the assist characteristic deciding portion decides the assist amount for the steering shaft based on the vehicle speed value of the vehicle speed sensor and the values of the twisting torque T1 from the first detection coil and the second detection coil, and
wherein, when the bending load amount is detected by the bending load detector, the assist characteristic deciding portion determines the vehicle operating condition based on the bending load amount detected by the bending load detector, and the vehicle speed value of the vehicle speed sensor when the bending load amount is detected, and adjusts the decided assist amount for the steering shaft according to the operating condition as determined.

8. The control unit for the electric power steering device according to claim 5, wherein the assist characteristic deciding portion performs a damper feel control for the steering shaft based on the bending load amount detected by the bending load detector, the vehicle speed value of the vehicle speed sensor when the bending load amount is detected, and the values of the twisting torque T1 from the first detection coil and the second detection coil when the bending load amount is detected.

9. The control unit for the electric power steering device according to claim 6, wherein the assist characteristic deciding portion performs a damper feel control for the steering shaft based on the bending load amount detected by the bending load detector, the vehicle speed value of the vehicle speed sensor when the bending load amount is detected, and the values of the twisting torque T1 from the first detection coil and the second detection coil when the bending load amount is detected.

10. The control unit for the electric power steering device according to claim 3, wherein the assist characteristic deciding portion determines the vehicle operating condition based on the bending load amount detected by the bending load detector, a vehicle speed value detected by a vehicle speed sensor for detecting vehicle speed, the values of the twisting torque T1 from the first detection coil and the second detection coil, and a tilt angle value from a tilt angle sensor for detecting a vehicle tilt angle to adjust the assist amount for the steering shaft according to the operating condition as determined and to perform a damper feel control.

11. A control unit for an electric power steering device comprising:
a steering shaft;
a first magnetostrictive film and a second magnetostrictive film with magnetic anisotropic properties opposite in direction to each other, each formed circumferentially on a surface of the steering shaft;
a first detection coil and a second detection coil provided around the first magnetostrictive film and the second magnetostrictive film, respectively, for detecting a twisting torque T1 applied to the steering shaft based on actual detection values of the first detection coil and the second detection coil to adjust an assist amount for the steering shaft;
a storage unit for storing:
an initial characteristic curve C1 formed from an initial detection value Z1 of the first detection coil when only the twisting torque T1 is applied to the steering shaft, and an initial characteristic curve C2 formed from an initial detection value Z2 of the second detection coil when only the twisting torque T1 is applied to the steering shaft; and
a characteristic curve C3 being formed from the actual detection value P1 of first detection coil, and a characteristic curve C4 being formed from the actual detection value P2 of the second detection coil; and
a bending load detector for detecting the bending load amount acting on the steering shaft based on
a difference ΔS between the actual detection value P1 on the characteristic curve C3 and the initial detection value Z1 on the initial characteristic curve C1, and on
a difference ΔS between the actual detection value P2 on the characteristic curve C3 and the initial detection value Z2 on the initial characteristic curve C2.

12. The control unit for the electric power steering device according to claim 11, wherein, when the twisting torque T1 is applied in one direction from a neutral position of the steering shaft, each of the initial characteristic curves C1, C2 has an upwardly convex curve shape that reaches a peak at a predetermined torque T1,
on the other hand, when the twisting torque T1 is applied in an opposite direction from the neutral position of the steering shaft, each of the initial characteristic curves C1, C2 has a gradually decaying curve shape,
wherein the initial characteristic curves C1, C2 of the first detection coil and the second detection coil have opposite characteristics with the initial detection values Z1, Z2 being symmetric with respect to the neutral position of the steering shaft, and
wherein the bending load detector detects the twisting torque T1 corresponding to each of the actual detection values P1, P2 detected by the first detection coil and the second detection coil from a range having the gradually decaying curve shape on one of the initial characteristic curve C1 of the first detection coil and the initial characteristic curve C2 of the second detection coil, and obtains each of the actual detection values P1, P2 corresponding to the detected twisting torque T1 from a range having the upwardly convex curve shape on the other initial characteristic curve to detect the bending load amount based on the difference ΔS between the initial detection values Z1, Z2 and the actual detection values P1, P2 detected by the first detection coil or the second detection coil.

13. The control unit for the electric power steering device according to claim 11, and further including the assist characteristic deciding portion that determines a vehicle operating condition based on the bending load amount detected by the bending load detector, and adjusts an assist amount for the steering shaft according to the operating condition as determined.

14. The control unit for the electric power steering device according to claim 12, and further including the assist characteristic deciding portion that determines a vehicle operating condition based on the bending load amount detected by the bending load detector, and adjusts an assist amount for the steering shaft according to the operating condition as determined.

15. The control unit for the electric power steering device according to claim 13, wherein the assist characteristic deciding portion determines the vehicle operating condition based on the bending load amount detected by the bending load detector and a vehicle speed value detected by a vehicle speed sensor for detecting vehicle speed, and adjusts the assist amount for the steering shaft according to the operating condition as determined.

16. The control unit for the electric power steering device according to claim 14, wherein the assist characteristic deciding portion determines the vehicle operating condition based on the bending load amount detected by the bending load detector, a vehicle speed value of the vehicle speed sensor when the bending load amount is detected, and the values of the twisting torque T1 from the first detection coil and the second detection coil when the bending load amount is detected, and adjusts the assist amount for the steering shaft according to the operating condition as determined.

17. The control unit for the electric power steering device according to claim 16, wherein the assist characteristic deciding portion decides the assist amount for the steering shaft based on the vehicle speed value of the vehicle speed sensor and the values of the twisting torque T1 from the first detection coil and the second detection coil, and wherein, when the bending load amount is detected by the bending load detector, the assist characteristic deciding portion determines the vehicle operating condition based on the bending load amount detected by the bending load detector, and the vehicle speed value of the vehicle speed sensor when the bending load amount is detected, and adjusts the decided assist amount for the steering shaft according to the operating condition as determined.

18. The control unit for the electric power steering device according to claim 15, wherein the assist characteristic deciding portion performs a damper feel control for the steering shaft based on the bending load amount detected by the bending load detector, the vehicle speed value of the vehicle speed sensor when the bending load amount is detected, and the values of the twisting torque T1 from the first detection coil and the second detection coil when the bending load amount is detected.

19. The control unit for the electric power steering device according to claim 16, wherein the assist characteristic deciding portion performs a damper feel control for the steering shaft based on the bending load amount detected by the bending load detector, the vehicle speed value of the vehicle speed sensor when the bending load amount is detected, and the values of the twisting torque T1 from the first detection coil and the second detection coil when the bending load amount is detected.

20. The control unit for the electric power steering device according to claim 13, wherein the assist characteristic deciding portion determines the vehicle operating condition based on the bending load amount detected by the bending load detector, a vehicle speed value detected by a vehicle speed sensor for detecting vehicle speed, the values of the twisting torque T1 from the first detection coil and the second detection coil, and a tilt angle value from a tilt angle sensor for detecting a vehicle tilt angle to adjust the assist amount for the steering shaft according to the operating condition as determined and to perform a damper feel control.

* * * * *